US012570275B2

(12) United States Patent
Higuma et al.

(10) Patent No.: US 12,570,275 B2
(45) Date of Patent: Mar. 10, 2026

(54) PARKING ASSISTANCE APPARATUS

(71) Applicant: TOYOTA JIDOSHA KABUSHIKI KAISHA, Toyota (JP)

(72) Inventors: Tomohito Higuma, Toyota (JP); Toshihiro Takagi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/655,979

(22) Filed: May 6, 2024

(65) Prior Publication Data

US 2024/0425038 A1     Dec. 26, 2024

(30) Foreign Application Priority Data

Jun. 21, 2023     (JP) ................................. 2023-101655

(51) Int. Cl.
B60W 30/06          (2006.01)
B60W 50/14          (2020.01)
(52) U.S. Cl.
CPC ............ B60W 30/06 (2013.01); B60W 50/14 (2013.01)
(58) Field of Classification Search
CPC .............................. B60W 30/06; B60W 50/14
See application file for complete search history.

(56) References Cited

U.S. PATENT DOCUMENTS

| | | |
|---|---|---|
| 9,522,661 B2 | 12/2016 | Inoue et al. |
| 9,604,638 B2 | 3/2017 | Kiyokawa et al. |

| | | | |
|---|---|---|---|
| 9,738,276 B2 | 8/2017 | Kiyokawa et al. | |
| 9,828,028 B2 | 11/2017 | Ishijima et al. | |
| 9,836,658 B2 | 12/2017 | Kiyokawa et al. | |
| 9,875,655 B2 | 1/2018 | Kiyokawa et al. | |
| 10,031,227 B2 | 7/2018 | Kiyokawa et al. | |
| 10,150,486 B2 | 12/2018 | Hoshino et al. | |
| 10,239,520 B2 | 3/2019 | Tomozawa et al. | |
| 10,377,416 B2 | 8/2019 | Fukukawa et al. | |
| 11,886,185 B2 * | 1/2024 | Suzuki ................. | G05D 1/0016 |
| 2018/0362023 A1 * | 12/2018 | Kim ...................... | B60W 30/06 |
| 2022/0274586 A1 | 9/2022 | Tokuhiro et al. | |
| 2023/0382369 A1 * | 11/2023 | Maruki .............. | B62D 15/0285 |

FOREIGN PATENT DOCUMENTS

| | | |
|---|---|---|
| JP | 2022-133230 A | 9/2022 |

* cited by examiner

*Primary Examiner* — Luke Huynh
(74) *Attorney, Agent, or Firm* — Sughrue Mion, PLLC

(57)          ABSTRACT

A parking assistance apparatus executes an automatic parking control of automatically moving an own vehicle along a registered parking route to park the own vehicle in a registered parking space. When the own vehicle reaches a registered notification start point on the registered parking route or reaches a point within a predetermined distance from the registered notification start point, the parking assistance apparatus performs an assistance availability notification which notifies an operator of the own vehicle that the operator can park the own vehicle in the registered parking space by the automatic parking control. When an update condition that the operator requests an execution of the automatic parking control, becomes satisfied after starting to perform the assistance availability notification, the parking assistance apparatus newly registers a point where the update condition becomes satisfied as the notification start point.

3 Claims, 3 Drawing Sheets

FIG.2A                    FIG.2B

PARKING ASSISTANCE APPARATUS

CROSS-REFERENCE TO RELATED APPLICATIONS

This application claims priority to Japanese patent application No. JP 2023-101655 filed on Jun. 21, 2023, the content of which is hereby incorporated by reference in its entirety.

BACKGROUND

Field

The present invention relates to a parking assistance apparatus.

Description of the Related Art

There is known a parking assistance apparatus which memorizes or registers, as a parking route, a route along which a driver moves a vehicle to park the same in a parking space by manual driving operation and executes an automatic parking control of automatically moving the vehicle to park the same in the parking space along the registered parking route when an automatic parking of the vehicle in the parking space is requested by the driver.

Also, there is known a parking assistance apparatus which performs an assistance availability notification which notifies the driver that the driver can park the vehicle by the automatic parking control when the vehicle reaches a point where the automatic parking control can be started (for example, refer to JP 2022-133230).

It should be noted that a vehicle control relating to a parking of a vehicle is specified by a standard ISO 20900 (Partially automated parking systems: PAPS) and a standard ISO 16787 (Assisted parking systems: APS).

When the assistance availability notification is performed by the parking assistance apparatus at an earlier point of time than the driver desires, the driver may feel inconvenience.

SUMMARY

An object of the present invention is to provide a parking assistance apparatus which can perform the assistance availability notification, preventing the driver from feeling inconvenience.

A parking assistance apparatus according to the present invention comprises an electronic control unit configured to execute an automatic parking control of automatically moving an own vehicle along a registered parking route to park the own vehicle in a registered parking space. When the own vehicle reaches a registered notification start point on the registered parking route or reaches a point within a predetermined distance from the registered notification start point, the electronic control unit is configured to perform an assistance availability notification which notifies an operator of the own vehicle that the operator can park the own vehicle in the registered parking space by the automatic parking control. When an update condition that the operator requests an execution of the automatic parking control, becomes satisfied after the electronic control unit starts to perform the assistance availability notification, the electronic control unit is configured to newly register a point where the update condition becomes satisfied as the notification start point.

With the parking assistance apparatus according to the present invention, when the execution of the automatic parking control is requested when the own vehicle reaches a point on the side of the registered parking space with respect to the registered notification start point, the point is newly registered as the notification start point. Thus, the assistance availability notification can be prevented to start to be performed at a point where the operator does not desire to execute the automatic parking control. Therefore, the assistance availability notification can be performed, preventing the operator from feeling inconvenience.

In the parking assistance apparatus according to an aspect of the present invention, when the electronic control unit newly registers the point where the update condition becomes satisfied as the notification start point, the electronic control unit may be configured to register a parking route from the newly-registered notification start point.

With the parking assistance apparatus according to this aspect of the present invention, when the parking route is newly registered, the registered parking route is shortened. Thus, a load of memorizing the registered parking route can be reduced.

A parking assistance apparatus according to the present invention comprises an electronic control unit configured to execute an automatic parking control of automatically moving an own vehicle along a registered parking route to park the own vehicle in a registered parking space. When the own vehicle reaches a registered notification start point on the registered parking route or reaches a point within a predetermined distance from the registered notification start point, the electronic control unit is configured to perform an assistance availability notification which notifies an operator of the own vehicle that the operator can park the own vehicle in the registered parking space by the automatic parking control. When (i) an update condition that the operator requests an execution of the automatic parking control, becomes satisfied twice or more after the electronic control unit starts to perform the assistance availability notification, and (ii) points where the update condition becomes satisfied, are within a predetermined distance range from each other, the electronic control unit is configured to newly register one of the points as the notification start point.

With the parking assistance apparatus according to the present invention, the assistance availability notification can be performed, preventing the operator from feeling inconvenience for the same reasons described above. Further, the notification start point is newly registered when the update condition becomes satisfied twice or more. Therefore, a point which the operator desires to register, can be registered as the notification start point.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Below, a vehicle control apparatus including a parking assistance apparatus according to an embodiment of the present invention will be described with reference to the drawings. The technology according to the present invention described below is a technology applicable to a technology conforming to standards ISO20900 (Partially automated parking systems: PAPS) and ISO16787 (Assisted parking systems: APS).

Figure 1:
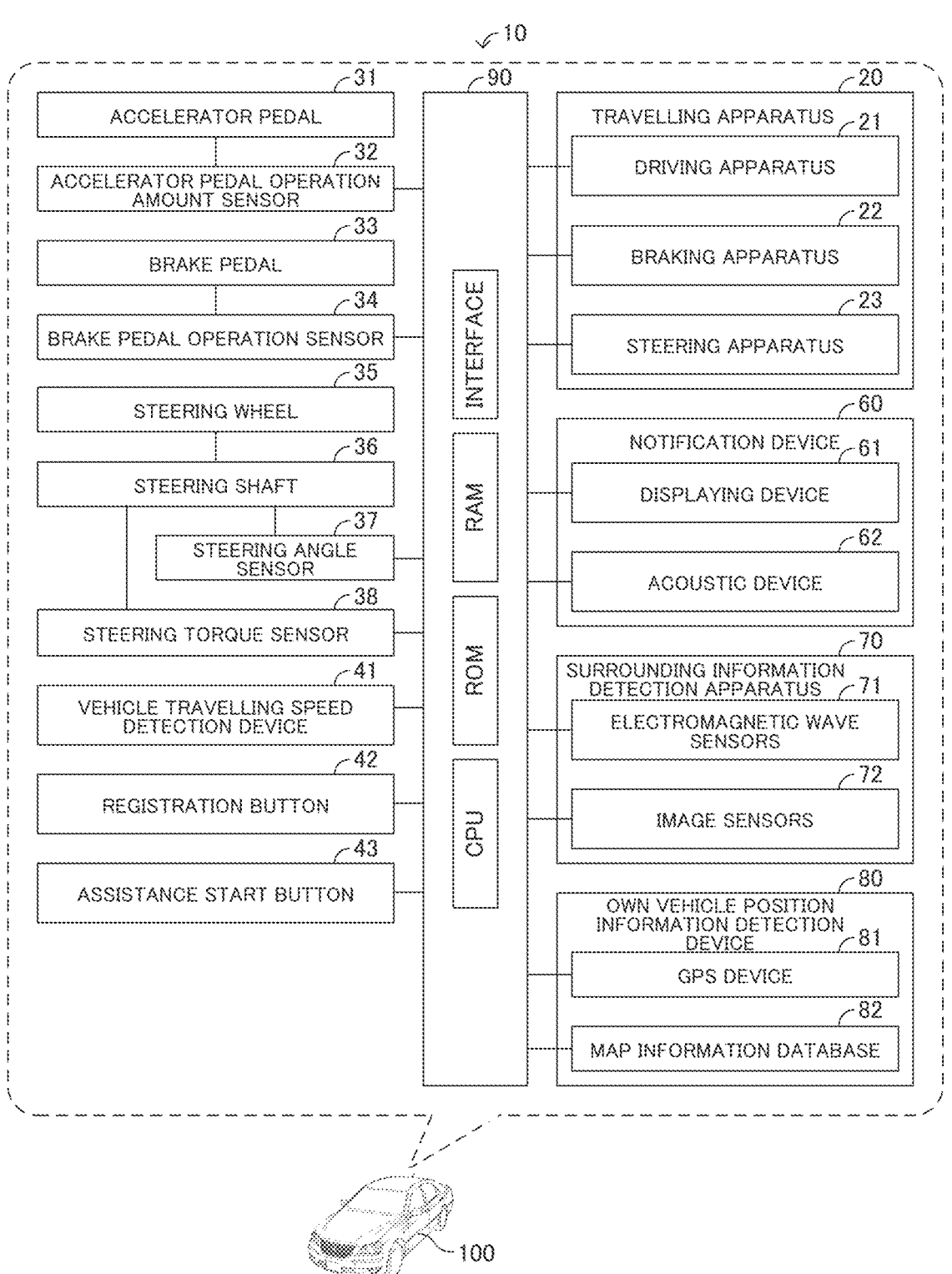
FIG. 1 is a view which shows a vehicle control apparatus including a parking assistance apparatus according to an embodiment of the present invention.

FIG. 1 shows a vehicle control apparatus 10 according to the embodiment of the present invention. The vehicle control apparatus 10 is mounted on an own vehicle 100. Hereinafter, the vehicle control apparatus 10 will be described by exemplifying that an operator of the own vehicle 100 is a person who is in the own vehicle 100 and drives the own vehicle 100, that is, a driver of the own vehicle 100.

However, the operator of the own vehicle 100 may be a remote operator of the own vehicle 100, i.e., an operator who is not in the own vehicle 100 but remotely drives the own vehicle 100. When the operator of the own vehicle 100 is the remote operator, the vehicle control apparatuses 10 are mounted on the own vehicle 100 and a remote operation facility installed outside the own vehicle 100 for remotely driving the own vehicle 100, and functions of the vehicle control apparatus 10 described below are realized by the vehicle control apparatus 10 mounted on the own vehicle 100 and the vehicle control apparatus 10 mounted on the remote operation facility.

As shown in FIG. 1, the vehicle control apparatus 10 includes an ECU (an electronic control device) 90 as a control device. The ECU 90 includes a microcomputer as a main component. The microcomputer includes a CPU, a storage medium such as ROM, RAM and a non-volatile memory, an interface, and the like. The CPU is configured or programmed to realize various functions by executing instructions, programs, or routines stored in the storage medium. In particular, in the present embodiment, the vehicle control apparatus 10 stores, in the storage medium, programs for realizing various kinds of controls executed by the vehicle control apparatus 10.

In the present embodiment, the vehicle control apparatus 10 includes only one ECU 90, but may include a plurality of ECUs, and may be configured to share the functions of the vehicle control apparatus 10 described below by the respective ECU.

Further, the vehicle control apparatus 10 may be configured to be able to update programs stored in the storage medium by wireless communication (for example, Internet communication) with external devices.

<Travelling Device>

Further, the own vehicle 100 is equipped with a travelling apparatus 20. The travelling apparatus 20 includes a driving apparatus 21, a braking apparatus 22, and a steering apparatus 23.

The driving apparatus 21 is an apparatus for outputting a driving torque (or a driving force) applied to the own vehicle 100 for driving the own vehicle 100, and includes, for example, an internal combustion engine, at least one motor generator, and the like. The driving apparatus 21 is electrically connected to the ECU 90. The vehicle control apparatus 10 controls the driving torque output from the driving apparatus 21 by controlling operations of the driving apparatus 21.

The braking apparatus 22 is an apparatus for outputting a braking torque (or a braking force) applied to the own vehicle 100 for braking the own vehicle 100, and includes, for example, a hydraulic braking device. The braking apparatus 22 is electrically connected to the ECU 90. The vehicle control apparatus 10 controls the braking torque output from the braking apparatus 22 by controlling operations of the braking apparatus 22.

The steering apparatus 23 is an apparatus for outputting a steering torque (or a steering force) applied to the own vehicle 100 for steering the own vehicle 100, and includes, for example, a power steering device. The steering apparatus 23 is electrically connected to the ECU 90. The vehicle control apparatus 10 controls the steering torque output from the steering apparatus 23 by controlling operations of the steering apparatus 23.

<Sensor, Etc.>

Further, the own vehicle 100 is equipped with an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle travelling speed detection device 41, a registration button 42 as a registration operation device, an assistance start button 43 as an assistance start operation device, a notification device 60, a surrounding information detection apparatus 70, and an own vehicle position information detection device 80.

The accelerator pedal operation amount sensor 32 is a sensor which detects an operation amount of the accelerator pedal 31 and is electrically connected to the ECU 90. The vehicle control apparatus 10 acquires the operation amount of the accelerator pedal 31 as an accelerator pedal operation amount AP by the accelerator pedal operation amount sensor 32. The vehicle control apparatus 10 acquires a required driving torque (or a required driving force) based on the accelerator pedal operation amount AP and a travelling speed of the own vehicle 100, except during when an automatic parking control described later being executed, and controls the operations of the driving apparatus 21 such that the driving torque corresponding to the required driving torque is applied from the driving apparatus 21 to the own vehicle 100 (particularly, driven wheels of the own vehicle 100).

The brake pedal operation amount sensor 34 is a sensor which detects an operation amount of the brake pedal 33 and is electrically connected to the ECU 90. The vehicle control apparatus 10 acquires the operation amount of the brake pedal 33 as a brake pedal operation amount BP by the brake pedal operation amount sensor 34. The vehicle control apparatus 10 acquires a required braking torque (or a required braking force) based on the brake pedal operation amount BP except when the automatic parking control described later is being executed, and controls the operations of the braking apparatus 22 such that the braking torque corresponding to the required braking torque is applied from the braking apparatus 22 to the own vehicle 100 (particularly, wheels of the own vehicle 100).

The steering angle sensor 37 is a sensor which detects a rotational angle of the steering shaft 36 with respect to its neutral position, and is electrically connected to the ECU 90. The vehicle control apparatus 10 acquires the rotation angle of the steering shaft 36 as a steering angle θ by the steering angle sensor 37.

The steering torque sensor 38 is a sensor which detects a torque input to the steering shaft 36 by the driver via the steering wheel 35, and is electrically connected to the ECU 90. The vehicle control apparatus 10 acquires, as a driver input torque, the torque input to the steering shaft 36 by the driver via the steering wheel 35 by the steering torque sensor 38.

The vehicle control apparatus 10 acquires a required steering torque based on the steering angle θ, the driver input torque, and the travelling speed of the own vehicle 100, except when the automatic parking control described later is being executed, and controls the operations of the steering apparatus 23 such that the steering torque corresponding to the required steering torque is applied from the steering apparatus 23 to the own vehicle 100 (in particular, steered wheels of the own vehicle 100).

The vehicle travelling speed detection device 41 is a device which detects the travelling speed of the own vehicle 100, and includes, for example, wheel rotation speed sensors. The vehicle travelling speed detection device 41 is electrically connected to the ECU 90. The vehicle control apparatus 10 acquires the travelling speed of the own vehicle 100 as an own vehicle travelling speed V by the vehicle travelling speed detection device 41.

The registration button 42 is a button operated by the driver to request a registration of a parking route Rr described later, and is electrically connected to the ECU 90. When the registration button 42 is operated, the vehicle control apparatus 10 determines that the registration of the parking route Rr is requested.

It should be noted that when a displaying device 61 described later includes a touch-operable display, the registration button 42 may be displayed as an image on the display.

The assistance start button 43 is a button operated by the driver to request an execution of the automatic parking control described later, and is electrically connected to the ECU 90. When the assistance start button 43 is operated, the vehicle control apparatus 10 determines that the execution of the automatic parking control is requested.

It should be noted that when the displaying device 61 described later includes a touch-operable display, the assistance start button 43 may be displayed as an image on the display.

The notification device 60 is a device which performs various types of notifications (in particular, assistance availability notifications described later) to the driver, and includes the displaying device 61 and an acoustic device 62 in the present embodiment.

The displaying device 61 includes, for example, a display for displaying various images, and is electrically connected to the ECU 90. The vehicle control apparatus 10 displays various images by the displaying device 61.

The acoustic device 62 includes, for example, a speaker for outputting various sounds, and is electrically connected to the ECU 90. The vehicle control apparatus 10 outputs various sounds from the acoustic device 62.

The surrounding information detection apparatus 70 is an apparatus which detects information around the own vehicle 100, and in the present embodiment, includes electromagnetic wave sensors 71 and imaging sensors 72.

The electromagnetic wave sensor 71 is, for example, a radar sensor such as a millimeter wave radar, a sound wave sensor such as an ultrasonic sensor such as a clearance sonar, or an optical sensor such as a laser radar such as a LIDAR, and is electrically connected to the ECU 90. The vehicle control apparatus 10 acquires information related to objects around the own vehicle 100 as surrounding detection information IS by the electromagnetic wave sensors 71.

The image sensor 72 is, for example, a camera, and is electrically connected to the ECU 90. The vehicle control apparatus 10 acquires image information on views around the own vehicle 100 as the surrounding detection information IS by the image sensors 72.

The own vehicle position information detection device 80 includes a GPS device 81 and a map information database 82.

The GPS device 81 is a device which receives so-called GPS signals and is electrically connected to the ECU 90. The vehicle control apparatus 10 acquires the GPS signals via the GPS device 81 and identifies or acquires a position of the own vehicle 100 based on the acquired GPS signals.

The map information database 82 is a database which stores map information and is electrically connected to the ECU 90. The vehicle control apparatus 10 knows where the own vehicle 100 is located on a map indicated by map information IM based on the position of the own vehicle 100 identified from the GPS signals and the map information IM.

<Operation of Vehicle Control Apparatus>

Figure 2:
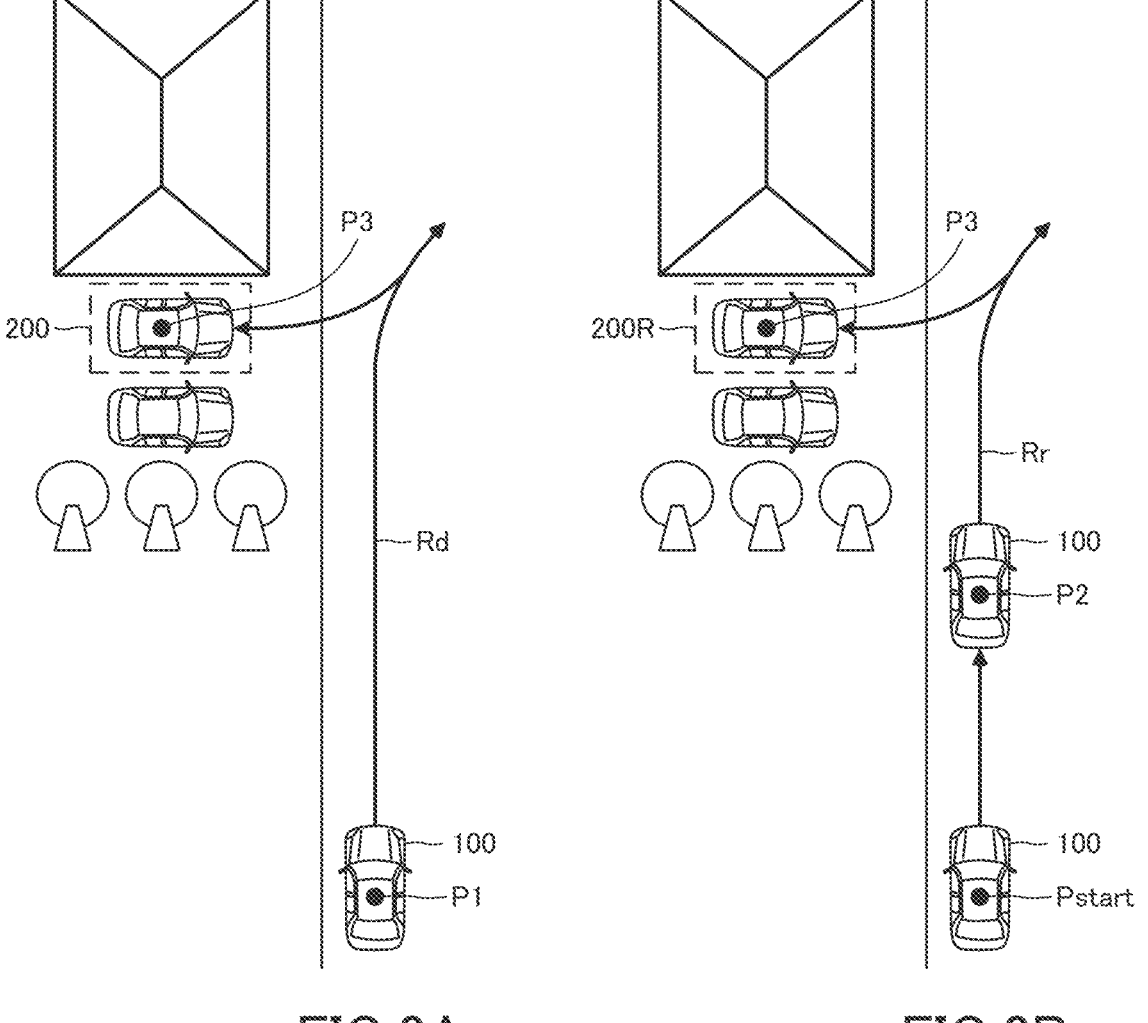
FIG. 2A is a view which shows a scene that an own vehicle is manually parked.
FIG. 2B is a view which shows a scene that the own vehicle is automatically parked.

Next, operations of the vehicle control apparatus 10 will be described. As shown in FIG. 2A, when the driver manually parks the own vehicle 100 in a parking space 200 and operates the registration button 42, the vehicle control apparatus 10 registers or stores the parking space 200 where the own vehicle 100 is parked as a parking space 200R, registers or stores a predetermined point Ppre as a notification start point Pstart, and registers or stores a part of a travelling route Rd from the predetermined point Ppre to a parking completion position Pcom as a parking route Rr. The travelling route Rd is a route along which the own vehicle 100 travels to the parking space 200.

In an example shown in FIG. 2A, the predetermined point Ppre is a point P1. That is, the predetermined point Ppre is a point on the travelling route Rd, and is a point on the travelling route Rd and at a predetermined distance (for example, 30 m) from a parking completion position Pcom.

In the example shown in FIG. 2A, the parking completion position Pcom is a point P3. That is, the parking completion position Pcom corresponds to the position of the own vehicle 100 when a parking of the own vehicle 100 in the parking space 200 is completed. It should be noted that the parking completion position Pcom is a position in the parking space 200.

The vehicle control apparatus 10 acquires information or data related to the parking space 200, the travelling route Rd, the predetermined point Ppre, and the parking completion position Pcom based on various information such as the surrounding detection information IS, the position of the own vehicle 100 identified from the GPS signals, the map information IM, the steering angle θ, and the own vehicle travelling speed V.

Figure 3:
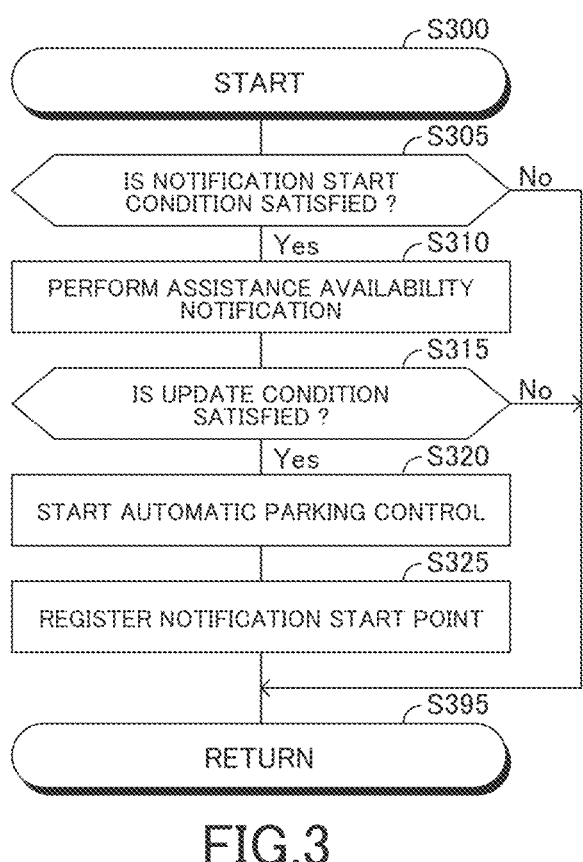
FIG. 3 is a view which shows a flowchart of a routine executed by the vehicle control apparatus according to the embodiment of the present invention.

Further, the vehicle control apparatus 10 is configured to execute a routine shown in FIG. 3 at predetermined time intervals. Therefore, at a predetermined point of time, the vehicle control apparatus 10 starts a process from a step S300 of the routine shown in FIG. 3 and proceeds with the process to a step S305 to determine whether or not a notification start condition Cstart is satisfied.

As shown in FIG. 2B, the notification start condition Cstart becomes satisfied when the own vehicle 100 reaches the registered notification start point Pstart. Alternatively, the notification start condition Cstart becomes satisfied when the own vehicle 100 reaches a point at a predetermined distance Dth from the registered notification start point Pstart. The vehicle control apparatus 10 determines whether or not the notification start condition Cstart becomes satisfied based on various kinds of information such as the surrounding detection information IS, the position of the own vehicle 100 identified from the GPS signals, and the map information IM.

When the vehicle control apparatus 10 determines "Yes" at the step S305, the vehicle control apparatus 10 proceeds with the process to a step S310 to perform an assistance availability notification.

The assistance availability notification is a notification which notifies the driver that the driver can automatically park the own vehicle 100 in the registered parking space 200R by the automatic parking control. In the present embodiment, the vehicle control apparatus 10 performs the assistance availability notification by the notification device 60. For example, the vehicle control apparatus 10 performs the assistance availability notification by displaying, by the displaying device 61, an image indicating that the own vehicle 100 can be automatically parked in the parking space 200 by the automatic parking control, or outputting, from the acoustic device 62, an announcement indicating that the own vehicle 100 can be automatically parked in the parking space 200 by the automatic parking control.

Next, the vehicle control apparatus 10 proceeds with the process to a step S315 to determines whether or not an assistance start operation has been performed. The assistance start operation is an operation applied to the assistance start button 43 by the driver. In other words, the vehicle control apparatus 10 determines whether or not an update condition Cupdate indicating that the assistance start operation is performed by the driver after the vehicle control apparatus 10 starts to perform the assistance availability notification, is satisfied, in other words, whether or not the update condition Cupdate indicating that the driver requests the execution of the automatic parking control, is satisfied.

When the vehicle control apparatus 10 determines "Yes" at the step S315, the vehicle control apparatus 10 proceeds with the process to a step S320 to start to execute the automatic parking control.

The automatic parking control is a control of causing the own vehicle 100 to travel along the registered parking route Rr and park the own vehicle 100 in the registered parking space 200R by automatically controlling the operations of the travelling apparatus 20. In addition, the vehicle control apparatus 10 controls the operations of the travelling apparatus 20 to park the own vehicle 100 in the registered parking space 200R such that the own vehicle 100 travels at a predetermined speed, preventing the own vehicle 100 from touching objects based on the surrounding detection information IS during the execution of the automatic parking control.

The vehicle control apparatus 10 executes the automatic parking control until the parking of the own vehicle 100 in the registered parking space 200R is completed, and terminate executing the automatic parking control when the parking of the own vehicle 100 in the registered parking space 200R is completed.

Next, the vehicle control apparatus 10 proceeds with the process to a step S325 to newly register or store a point where the update condition Cupdate becomes satisfied (a point P2 in the example shown in FIG. 2B) as the notification start point Pstart. At this time, the vehicle control apparatus 10 registers or stores a route from the newly-registered notification start point Pstart to the parking completion position Pcom as the parking route Rr.

However, the vehicle control apparatus 10 may be configured to hold the already-registered parking route Rr.

Further, the vehicle control apparatus 10 may be configured such that the driver can register, as the notification start point Pstart, a point farther from the registered parking space 200R than the newly-registered notification start point Pstart, when the vehicle control apparatus 10 newly registers, as the parking route Rr, a route from the newly-registered notification start point Pstart to the registered parking space 200R. Here, the registered parking route Rr is extended to a route from the notification start point Pstart registered by the driver to the registered parking space 200R.

Further, the vehicle control apparatus 10 may be configured to newly register, as the notification start point Pstart, one of points where the update condition Cupdate becomes satisfied when the update condition Cupdate becomes satisfied twice or more, and the points where the update condition Cupdate becomes satisfied are within a predetermined distance range.

Further, the vehicle control apparatus 10 may be configured to ask the driver whether or not to newly register or store, as the notification start point Pstart, the point where the update condition Cupdate becomes satisfied by the notification device 60, and newly register or store, as the notification start point Pstart, the point where the update condition Cupdate becomes satisfied when the driver performs an operation to approve of newly registering or storing, as the notification start point Pstart, the point where the update condition Cupdate becomes satisfied.

On the other hand, when the vehicle control apparatus 10 determines "No" at the step S315, the vehicle control apparatus 10 proceeds with the process directly to a step S395 to terminate executing the process of this routine once.

In addition, when the vehicle control apparatus 10 determines "No" at the step S305, the vehicle control apparatus 10 proceeds with the process directly to the step S395 to terminate executing the process of this routine once.

With the vehicle control apparatus 10, when the execution of the automatic parking control is requested when the own vehicle 100 reaches a point at the side of the registered parking space 200R with respect to the registered notification start point Pstart, the point is newly registered as the notification start point Pstart. Thus, the assistance availability notification can be prevented from starting to be performed at a point where the driver the driver does not desire to execute the automatic parking control. Therefore, the assistance availability notification can be performed, preventing the driver from feeling inconvenience.

It should be noted that the present invention is not limited to the above-described embodiments, and various modifications can be adopted within the scope of the present invention.

Further, the present invention can be applied to any of a vehicle which can be driven by manual driving operation and automatic driving control, and a vehicle which is driven only by the automatic driving control. The manual driving operation is a driving operation performed by the operator to drive the vehicle. The automatic driving control is a control in which a control device such as the ECU automatically causes the vehicle to travel without the operator performing a driving operation for causing the vehicle to travel.

What is claimed is:

1. A parking assistance apparatus comprising an electronic control unit configured to execute an automatic parking control of automatically moving an own vehicle along a registered parking route to park the own vehicle in a registered parking space, wherein the electronic control unit is configured to:

when the own vehicle reaches a registered notification start point on the registered parking route or reaches a point within a predetermined distance from the registered notification start point, perform an assistance availability notification which notifies an operator of the own vehicle that the operator can park the own vehicle in the registered parking space by the automatic parking control; and when an update condition is satisfied, newly register a point where the update condition was satisfied as the registered notification start point on the registered parking route, wherein the update condition is satisfied when the operator requests starting an execution of the automatic parking control after the assistance availability notification is performed.

2. The parking assistance apparatus according to claim 1, wherein when the electronic control unit newly registers the point where the update condition becomes satisfied as the notification start point, the electronic control unit is configured to register a parking route from the newly-registered notification start point.

3. A parking assistance apparatus comprising an electronic control unit configured to execute an automatic parking control of automatically moving an own vehicle along a registered parking route to park the own vehicle in a registered parking space, wherein the electronic control unit is configured to:

when the own vehicle reaches a registered notification start point on the registered parking route or reaches a point within a predetermined distance from the registered notification start point, perform an assistance availability notification which notifies an operator of the own vehicle that the operator can park the own vehicle in the registered parking space by the automatic parking control; and when (i) an update condition is, and (ii) points where the update condition is satisfied are within a predetermined distance range from each other, newly register one of the points where the update condition was satisfied as the registered notification start point on the registered parking route, wherein the update condition is satisfied when the operator requests starting an execution of the automatic parking control after the assistance availability notification is performed.

* * * * *